(12) United States Patent
Lin

(10) Patent No.: US 11,536,418 B2
(45) Date of Patent: Dec. 27, 2022

(54) TELESCOPIC BRACKET AND OPEN-UP DEVICE USING THE SAME

(71) Applicant: Shanghai Chungrong Spring Co.,LTD., Shanghai (CN)

(72) Inventor: Hsin-Yung Lin, Shanghai (CN)

(73) Assignee: SHANGHAI CHUNGRONG SPRING CO., LTD., Shanghai (CN)

( * ) Notice: Subject to any disclaimer, the term of this patent is extended or adjusted under 35 U.S.C. 154(b) by 80 days.

(21) Appl. No.: 16/854,445

(22) Filed: Apr. 21, 2020

(65) Prior Publication Data

US 2020/0340619 A1 Oct. 29, 2020

(30) Foreign Application Priority Data

Apr. 24, 2019 (CN) .......................... 201920565623.1

(51) Int. Cl.
| | |
|---|---|
| *F16M 13/02* | (2006.01) |
| *A47C 19/04* | (2006.01) |
| *E05F 1/08* | (2006.01) |
| *F16B 7/10* | (2006.01) |

(52) U.S. Cl.
CPC ........... *F16M 13/022* (2013.01); *A47C 19/04* (2013.01); *E05F 1/08* (2013.01); *F16B 7/10* (2013.01); *E05Y 2900/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,907,598 A * | 10/1959 | Hart | ....................... | A47B 91/02 403/112 |
| 3,032,362 A * | 5/1962 | Lovejoy | ..................... | B25J 1/04 40/604 |
| 3,390,874 A * | 7/1968 | McCarthy | ............... | F16B 7/105 403/325 |
| 4,140,304 A * | 2/1979 | Ghrist | ....................... | F16F 1/44 213/45 |
| 6,394,405 B1 * | 5/2002 | Roxton | ................... | E21D 15/56 74/532 |
| 8,844,895 B2 * | 9/2014 | Palma | ..................... | E05C 17/30 248/200.1 |
| 8,939,438 B2 * | 1/2015 | Kempf | ..................... | F16F 1/047 267/148 |
| 9,580,945 B2 * | 2/2017 | Artin | ....................... | E05C 17/02 |
| 10,342,358 B1 * | 7/2019 | Palashewski | .......... | A61G 7/018 |

(Continued)

FOREIGN PATENT DOCUMENTS

JP         2020026854 A  *  2/2020

*Primary Examiner* — Monica E Millner

(57) ABSTRACT

A telescopic bracket has a retracted state and an extended state. The telescopic bracket comprises a fixed assembly, a moving member, and a spring. The moving member is movably coupled to the fixed assembly to move along an axial direction of the fixed assembly, causing the telescopic bracket to switch between the retracted state and the extended state. The spring is disposed between the fixed assembly and the moving member to provide an elastic restoring force to the moving member, and the cross section of the spring could be a trapezoidal shape, a rectangular shape, a square shape, a parallelogram shape, or an unequal quadrilateral shape. An open-up device using the telescopic bracket is also provided.

9 Claims, 8 Drawing Sheets

(56) References Cited

U.S. PATENT DOCUMENTS

| | | | | |
|---|---|---|---|---|
| 11,208,836 B2* | 12/2021 | Goldmann | ............ | E05F 1/1091 |
| 2009/0121110 A1* | 5/2009 | Fabbri | .................... | E04G 25/08 |
| | | | | 248/354.1 |
| 2009/0206531 A1* | 8/2009 | Probst | .................... | E05F 15/47 |
| | | | | 267/64.26 |
| 2013/0175419 A1* | 7/2013 | Wheeler | ................ | E05C 17/02 |
| | | | | 248/354.1 |
| 2015/0267724 A1* | 9/2015 | Dyer | .................... | F15B 15/261 |
| | | | | 92/15 |
| 2019/0063134 A1* | 2/2019 | Anderson | ............... | E05C 17/30 |

\* cited by examiner

TELESCOPIC BRACKET AND OPEN-UP DEVICE USING THE SAME

The present application is based on, and claims priority from, China application number CN201920565623.1, filed on 2019 Apr. 24, the disclosure of which is hereby incorporated by reference herein in its entirety.

BACKGROUND OF THE INVENTION

Field of the Invention

The present invention relates to an open-up device, more particularly, to an open-up device using a telescopic bracket comprising a spring, wherein the cross section of the spring is a trapezoidal shape, a rectangular shape, a square shape, a parallelogram shape, or an unequal quadrilateral shape.

Description of the Prior Art

Many devices, such as furniture, cars, and machinery, use an open-up device to achieve a movable seal. For example, a bed frame with a storage function can be used to open a storage space, which is below a bed plate, by opening up a bed plate, and a rear trunk of a car is also opened by opening up a rear door. Due to gravity, the open-up movement needs more upward force, which needs to be achieved by the user's force. However, not every item is light enough to open up by every user, and the open-up movement is more laborious than the open movement in other directions. Although some devices, such as the rear door of an RV, can automatically open the rear door through driving a motor, gravity still causes the motor needs to provide more kinetic energy to open the rear door.

In order to solve the problem of being laborious or time-consuming, existing manufacturers provide a telescopic device of the pneumatic rod, which assists in pushing up the bed plate to achieve the goal of saving labor. However, the pressure of the pneumatic rod is easily damaged and decayed after long-term use. Once the pneumatic rod fails, there is a high risk that the opened-up heavy object will fall with the force of gravity acceleration due to the loss of support.

Therefore, the inventor has worked hard for many years to research a telescopic bracket instead of the pneumatic rod. The telescopic bracket uses springs as the kinetic energy to assist in retracting and expanding with each other by mechanical interaction to avoid the problem that the pneumatic rod is prone to failure due to aging.

SUMMARY OF THE INVENTION

In response to the above-mentioned problems, an objective of the present invention is to provide a telescopic bracket and open-up device using the same to solve the problems of the prior art. According to a specific embodiment of the present invention, the telescopic bracket has a retracted state and an extended state. The telescopic bracket comprises a fixed assembly, a moving member and a spring. The moving member is movably coupled to the fixed assembly to move along an axial direction of the fixed assembly, causing the telescopic bracket to switch between the retracted state and the extended state. The spring is disposed between the fixed assembly and the moving member to provide an elastic restoring force to the moving member, wherein the cross section of the spring could be a trapezoidal shape, a rectangular shape, a square shape, a parallelogram shape, or an unequal quadrilateral shape.

In a specific embodiment, when the telescopic bracket is in the retracted state, the spring is in a compressed state to provide the elastic restoring force to the fixed assembly and the moving member along the moving direction of the moving member to assist the telescopic bracket to switch from the retracted state to the extended state.

In a specific embodiment, the fixed assembly can further comprise a body and a screw rod extending from the body. The screw rod has a first screw thread and is able to rotate on the body along the axial direction of the screw rod. The moving member sleeves on the periphery of the screw rod, and the inside of the moving member has a second screw thread corresponding to the first screw thread. So that the moving member is able to move along the axial direction of the screw rod corresponding to the rotation direction of the screw rod, thereby the telescopic bracket switches between the retracted state and the extended state.

In a specific embodiment, the fixed assembly can further comprise a protective member sleeving on the periphery of the moving member, and one end of the protective member is coupled to the body. The protective member is configured to protect the exposed screw rod, which is exposed after the moving member moves along the axial direction far from the body.

In a specific embodiment, the protective member can further comprise a first limiting member disposed on the inner surface therein, and the moving member can further comprise a second limiting member corresponding to the first limiting member, and the second limiting member is disposed on the outer surface of the moving member, wherein the first limiting member and the second limiting member are engaged with each other to restrict the moving member to move along the axial direction of the screw rod.

In a specific embodiment, the fixed assembly can further comprise an actuating member disposed therein, and the actuating member is configured to drive the fixed assembly to make the fixed assembly drive the moving member to move along the axial direction of the fixed assembly.

Another objective of the present invention is to provide an open-up device having a telescopic bracket, comprising a base, a telescopic bracket, and a cover. A first end of the telescopic bracket is coupled to the base. The telescopic bracket has a fixed assembly, a moving member and a spring. The spring is disposed between the fixed assembly and the moving member to provide an elastic restoring force, wherein the cross section of the spring is a trapezoidal shape, a rectangular shape, a square shape, a parallelogram shape, or an unequal quadrilateral shape. The cover is coupled to a second end of the telescopic bracket, and one side of the cover is pivotally coupled to the base; thereby, the cover is able to rotate relative to the base. The cover is opened-up from the base or closed to the base by a pivot formed at the position where the cover is pivotally coupled to the base, through the telescopic action of the telescopic bracket.

In a specific embodiment, the telescopic bracket can further comprise an actuating member, which has a signal receiver configured to receive an external signal for actuating the actuating member; thereby, the telescopic bracket is retracted or extended.

In a specific embodiment, the base is a car body and the cover is a car door corresponding to the car body.

In a specific embodiment, the base is a bed frame and the cover is a bed plate corresponding to the bed frame.

Compared with the prior art, the telescopic bracket and the open-up device using the same have the following advantages: 1. The open-up device applied by the telescopic bracket, when the user opens up the cover, the cover can be opened up by the user without labor through the auxiliary force of the telescopic bracket; 2. The cover can be supported by the spring of the telescopic bracket to prevent the cover from falling due to its gravity; 3. The telescopic bracket can use the actuating member to achieve automatic retraction and expansion, so that the user can use a remote switch or a sensing device to trigger the actuating member. Therefore, the user can open and close the open-up device without applying force.

BRIEF DESCRIPTION OF THE APPENDED DRAWINGS

Some of the embodiments will be described in detail, with reference to the following figures, wherein like designations denote like members, wherein:

FIG. 2A shows a partially enlarged schematic diagram of FIG. 2.

FIG. 3A shows a partially enlarged schematic diagram of FIG. 3.

The advantages, spirits, and features of the present invention will be explained and discussed with embodiments and figures as follows.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications can be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

The terminology used in the various embodiments disclosed in present invention is only used to describe the specific embodiment, and is not intended to limit the various embodiments disclosed in present invention. As used herein, the singular form also includes the plural form unless the context clearly indicated otherwise. Unless otherwise defined, all terms (including technical and scientific terms) used in this specification have the same meanings as commonly understood by one of ordinary skill in the art to which the various embodiments of the present invention disclosure belong. The above terms (such as those defined in commonly used dictionaries) will be interpreted as having the same meaning as the contextual meaning in the same technical field, and will not be interpreted as having an idealized or overly formal meaning, unless clearly defined in the various embodiments disclosed in the present invention.

In the description of the present specification, the terminologies "in an embodiment", "in another embodiment", or "in some embodiments" means that the specific feature, structure, material or characteristic of the present embodiment is involved in at least one embodiment of the present invention. In the description of the present specification, the schematic representation of the mentioned terminologies does not necessarily refer to the same embodiment. Furthermore, the described specific feature, structure, material or characteristic can be involved in any one or more embodiments in a proper way.

In the description of the present invention, unless otherwise specified or limited, it should be noted that the terms "coupled", "connected", and "disposed" should be understood in a broad sense. It can be the internal connection of two elements, it can be directly connected, or it can be indirectly connected through an intermediate medium. For ordinary people in the field, the specific meaning of the above terms can be understood according to the specific conditions.

Figure 1:
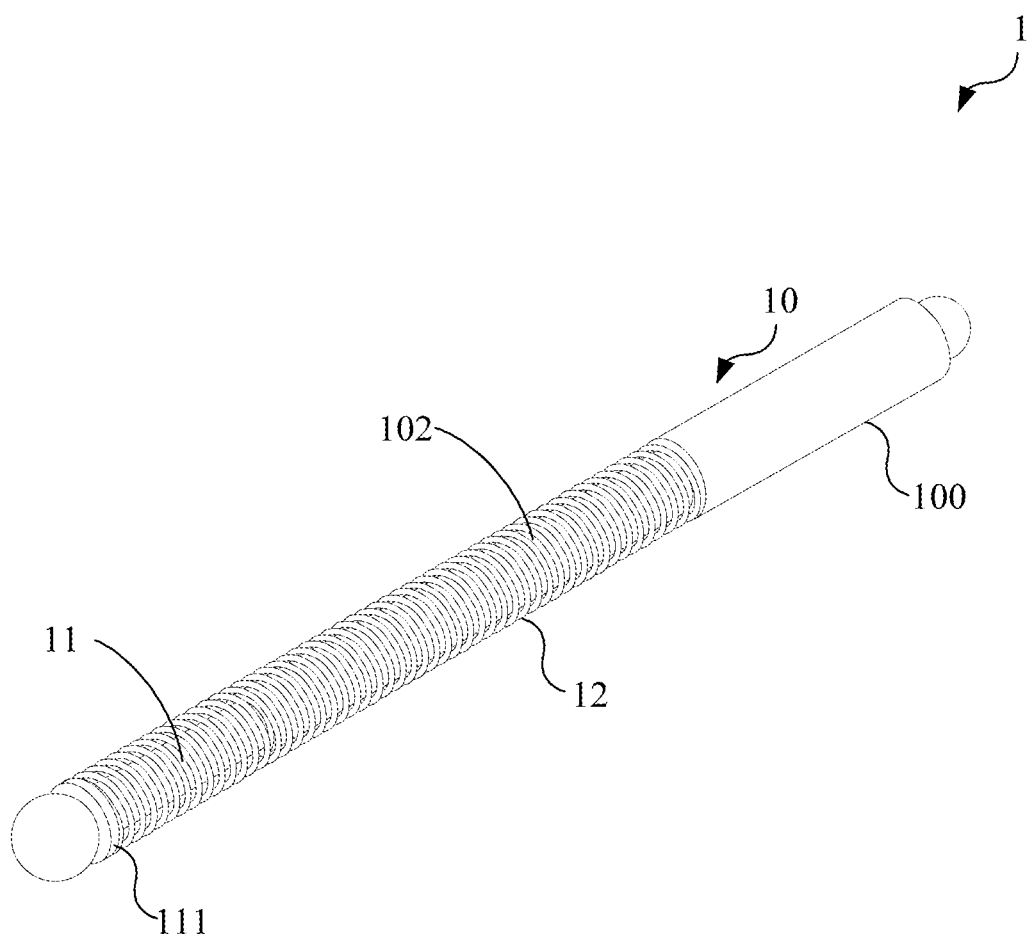
FIG. 1 shows a schematic diagram of one embodiment of the telescopic bracket of the present invention.
Figure 2:
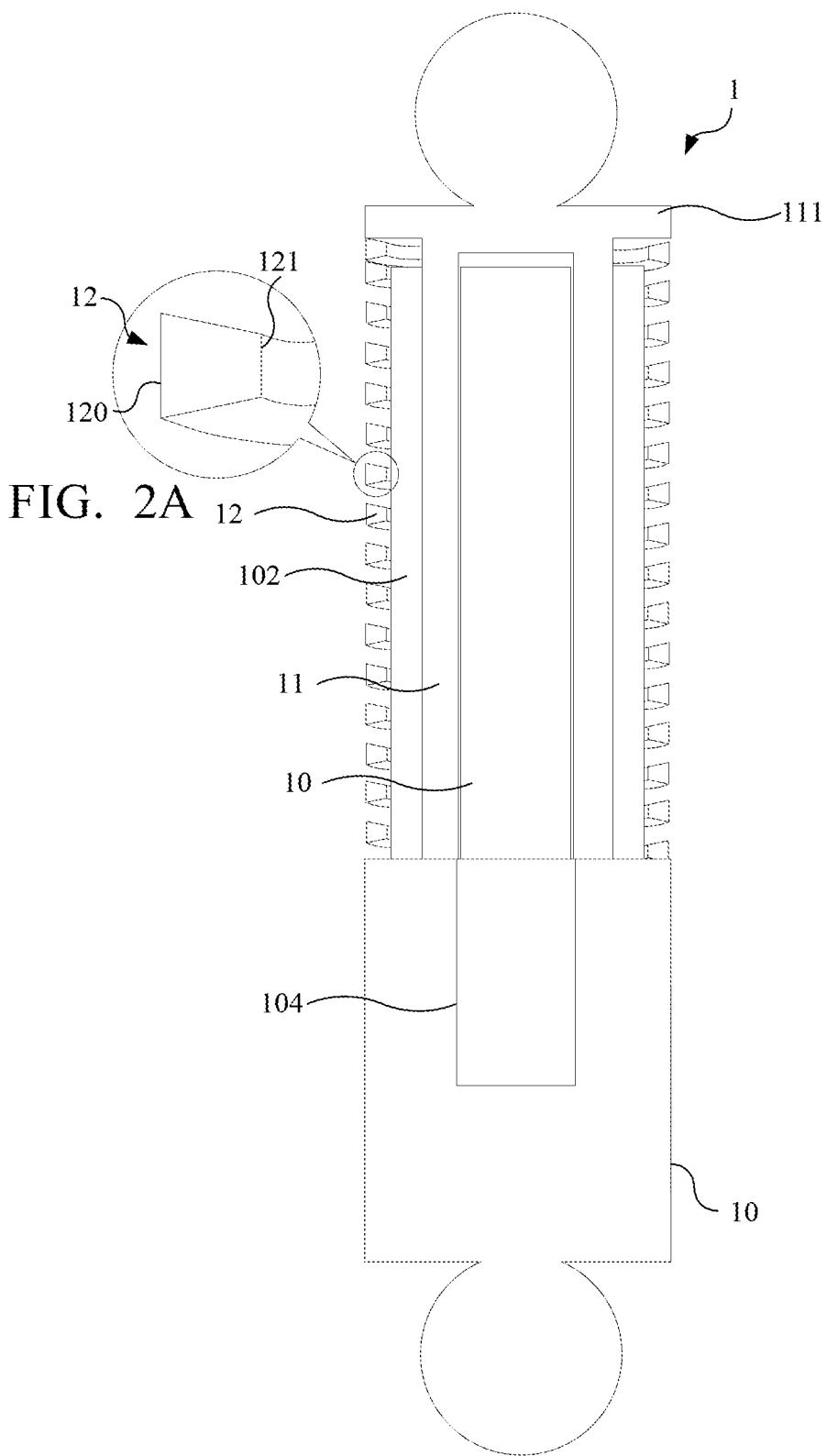
FIG. 2 shows a cross-sectional diagram of one embodiment of the telescopic bracket of the present invention.

Please refer to FIG. 1, FIG. 2 and FIG. 2A. FIG. 1 shows a schematic diagram of one embodiment of the telescopic bracket of the present invention. FIG. 2 shows a cross-sectional diagram of one embodiment of the telescopic bracket of the present invention. FIG. 2A shows a partially enlarged schematic diagram of FIG. 2. A telescopic bracket of the present invention has a retracted state and an extended state. As shown in FIG. 1, FIG. 2 and FIG. 2A, the telescopic bracket 1 comprises a fixed assembly 10, a moving member 11 and a spring 12. The moving member 11 is movably coupled to the fixed assembly 10 to move along an axial direction of the fixed assembly 10, causing the telescopic bracket 1 to switch between the retracted state and the extended state. The spring 12 can be disposed between the fixed assembly 10 and the moving member 11 to provide an elastic restoring force to the moving member 11. The cross section of the spring 12 is a trapezoidal shape, a rectangular shape, a square shape, a parallelogram shape, or an unequal quadrilateral shape.

Since the spring 12 has a compressed state, a tight state, and a balanced state between therein, and the spring 12 has a characteristic of switching from the compressed state to the balanced state and switching from the tight state to the balanced state by its own elastic restoring force. The present invention uses this characteristic to dispose the spring 12, which is in the compressed state, in the telescopic bracket 1, which is in the retracted state, so that the spring 12 will provide the elastic restoring force to the fixed assembly 10 and the moving member 11 along the moving direction of the moving member 11 to assist the telescopic bracket 1 to switch from the retracted state to the extended state. In detail, as shown in FIG. 2 and FIG. 2A, the embodiment of FIG. 2 is that the spring 12 is in the compressed state when the telescopic bracket 1 is in the retracted state. Therefore, when no external resistance force is applied to the fixed assembly 10 and the moving member 11, the elastic restoring force of the spring 12 can assist the moving member 11 to move along the axial direction of the fixed assembly 10, thereby causing the telescopic bracket 1 to switch from the retracted state to the extended state. In practice, when a user wants to switch the telescopic bracket 1 from the retracted state to the extended state, the elastic restoring force of the spring 12 can assist the user to switch, so that the user can extend the telescopic bracket 1 into the extended state without spending much effort. If the telescopic bracket 1 is automatically extended with a mechanical method or an electrical method, the elastic restoring force of the spring 12 can also reduce power consumption therein.

Figure 3:
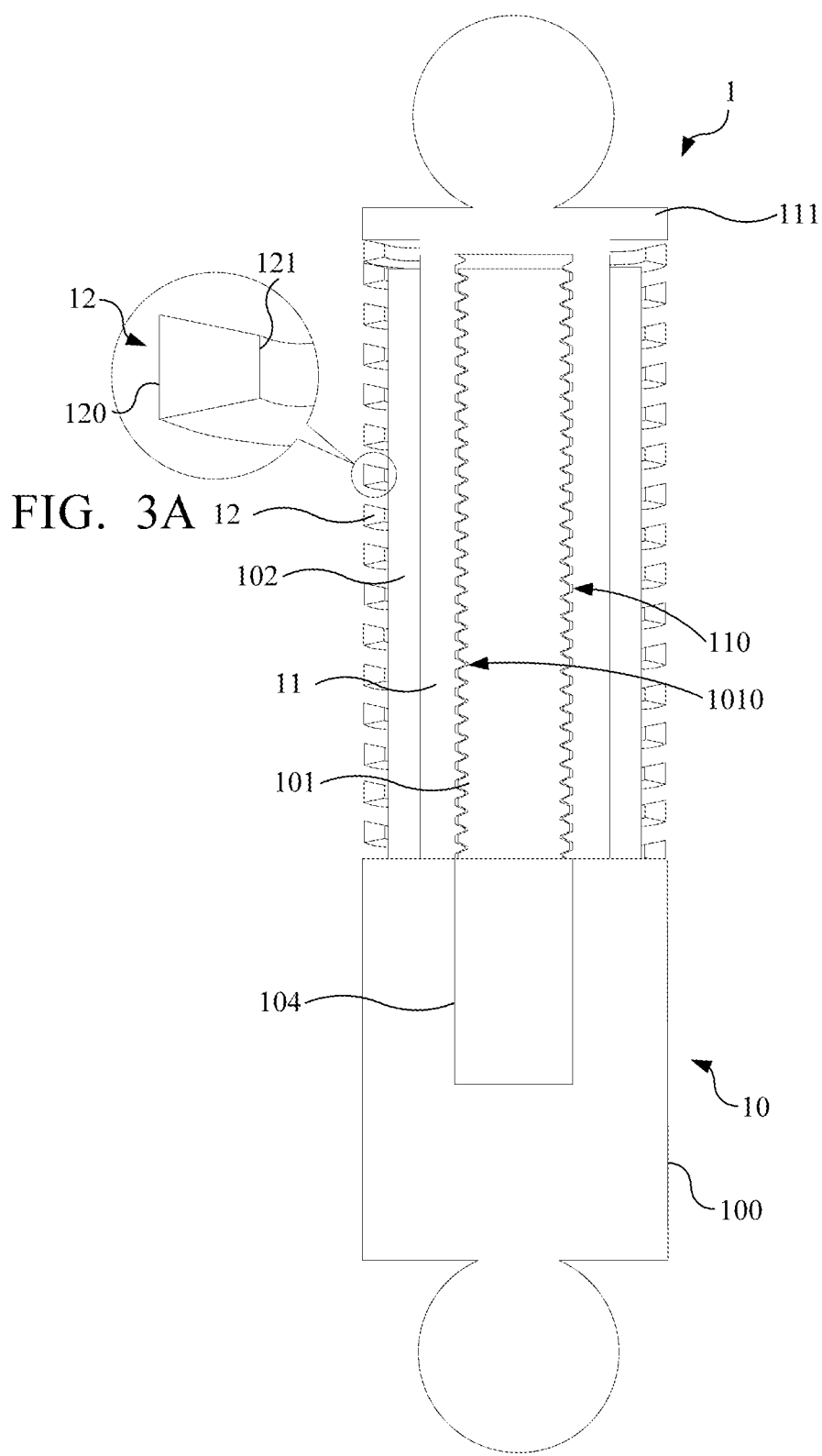
FIG. 3 shows a cross-sectional diagram of other embodiment of the telescopic bracket of the present invention.

Please refer to FIG. 3 and FIG. 3A. FIG. 3 shows a cross-sectional diagram of other embodiment of the telescopic bracket of the present invention. FIG. 3A shows a partially enlarged schematic diagram of FIG. 3. As shown in FIG. 3 and FIG. 3A, the fixed assembly 10 can further comprise a body 100 and a screw rod 101 extending from the body 100. The surface of the screw rod 101 has a first screw thread 1010 and can rotate on the body 100 along the axial direction of the screw rod 101. The moving member 11 can be sleeved on the periphery of the screw rod 101. The inner side of the moving member 11 has a second screw thread 110 corresponding to the first screw thread 1010 to screw the first thread 1010. In detail, when the screw rod 101 rotates in a different direction, the first thread 1010 drives the mating second thread 110 and the moving member 11. Then, the moving member 11 can correspond to the rotation direction of the screw rod 101 and can move forward or backward along the axial direction of the screw cod 101, thereby causing the telescopic bracket 1 to switch between the retracted state and the extended state. Two ends of the spring 12 can be respectively coupled to the fixed assembly 10 and the moving member 11. Specifically, as shown in FIG. 1 and FIG. 3, an abut against section 111 is protruded on one side of the moving member 11 away from the body 100, and the spring 12 can be disposed between the end of the body 100 close to the moving member 11 and the abut against section 111. When the telescopic bracket 1 is in the retracted state, the spring 12 may be in the compressed state to provide the elastic restoring force to the fixed assembly 10 and the moving member 11 along the moving direction of the moving member 11 to assist the telescopic bracket 1 to switch from the retracted state to the extended state.

The cross section of the spring 12 of the present invention could be a trapezoidal shape, a rectangular shape, a square shape, a parallelogram shape, or an unequal quadrilateral shape. Taking the trapezoidal shape as an example, as shown in a partially enlarged view of the spring 12 in FIG. 2A and FIG. 3A, the cross section of the spring 12 is the trapezoidal shape. In the specific embodiment, a bottom 120 of the trapezoidal shape is correspondingly disposed on the outer circumference of the spring 12, and a top 121 of the trapezoidal shape is correspondingly disposed on the inner circumference of the spring 12, wherein the bottom 120 is longer than the top 121. The spring 12 is disposed according to the above-mentioned way. Compared with the cross section of the spring, which is a circular shape, the cross section of the spring 12, which is trapezoidal shape, can carry a larger external force. In addition to being not easily deformed, it can also ensure that the spring 12 can keep moving along the axial direction when switching between the compressed state and the tight state, without deviating from the direction of operation. Although the bottom 120 of the cross section with trapezoidal shape of the spring 12 in this embodiment is located on the outer circumference of the spring 12 and the top 121 is located on the inner circumference of the spring 12, this is not limited in practice. In another specific embodiment, the bottom of the trapezoidal shape may be located closer to the body 100 of the fixed assembly 10 and the top of the trapezoidal shape may be located farther from the body 100 of the fixed assembly 10. Wherein, the top of the trapezoidal shape is shorter than the bottom of the trapezoidal shape. The cross sectional of other spring 12, such as a rectangular shape, a square shape, a parallelogram shape, or an unequal quadrilateral shape, can be deduced by analogy.

In practice, when the moving member 11 moves along the axial direction away from the body 100 through the rotation of the screw rod 101, the portion of the screw rod 101, which was already covered by the moving member 11, will be exposed due to the displacement of the moving member 11. The exposed portion of the screw rod 101 may be damaged or bent due to an external force, or foreign matter may be adhered to the exposed surface of the screw rod 101, so that the moving member 11 cannot be moved backward to the retracted state. Therefore, the fixed assembly 10 can further include a protective member 102 sleeved on the periphery of the moving member 11, and one end of the protective member 102 is coupled to the body 100. The protective member 102 can be configured for the exposed portion of the screw rod 101, as shown in FIG. 1 and FIG. 3.

Figure 4:
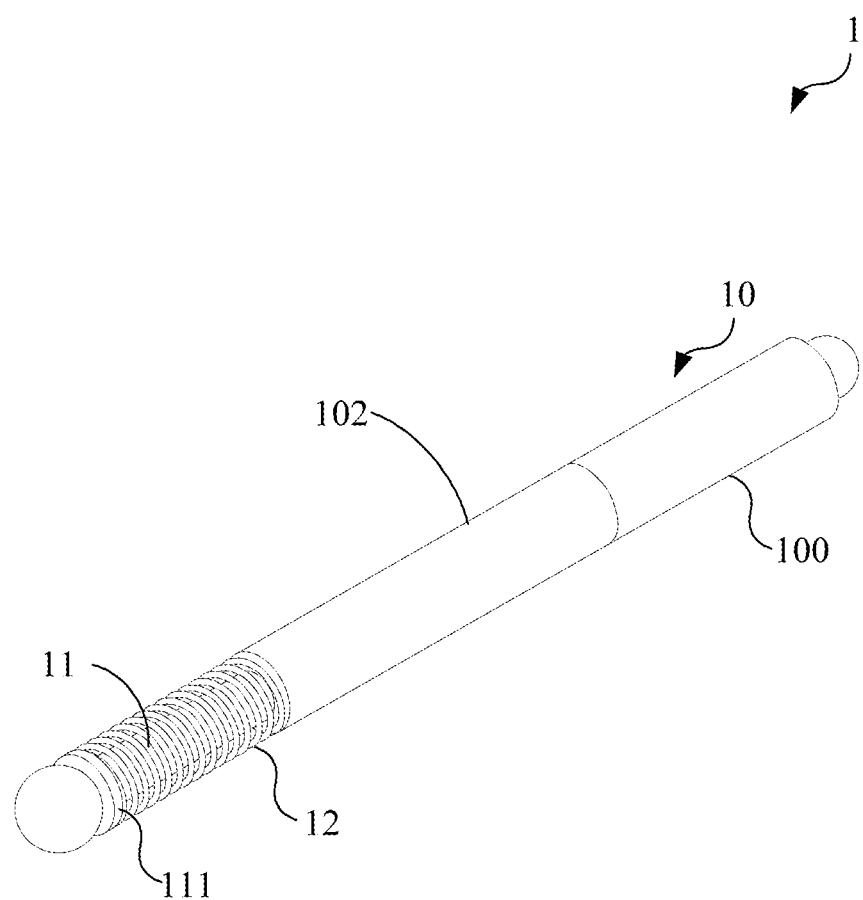
FIG. 4 shows a schematic diagram of other embodiment of the telescopic bracket of the present invention.

Please refer to FIG. 4. FIG. 4 shows a schematic diagram of other embodiment of the telescopic bracket 1 of the present invention. As shown in FIG. 4, this embodiment is different from the previous embodiment in that the spring 12 of this embodiment is disposed between the abut against section 111 and one end of the protective member 102 away from the body 100. Without affecting the function of the spring 12, the user can change the connection position of the spring 12 according to the use requirements, and is not limited to the above.

Figure 5:
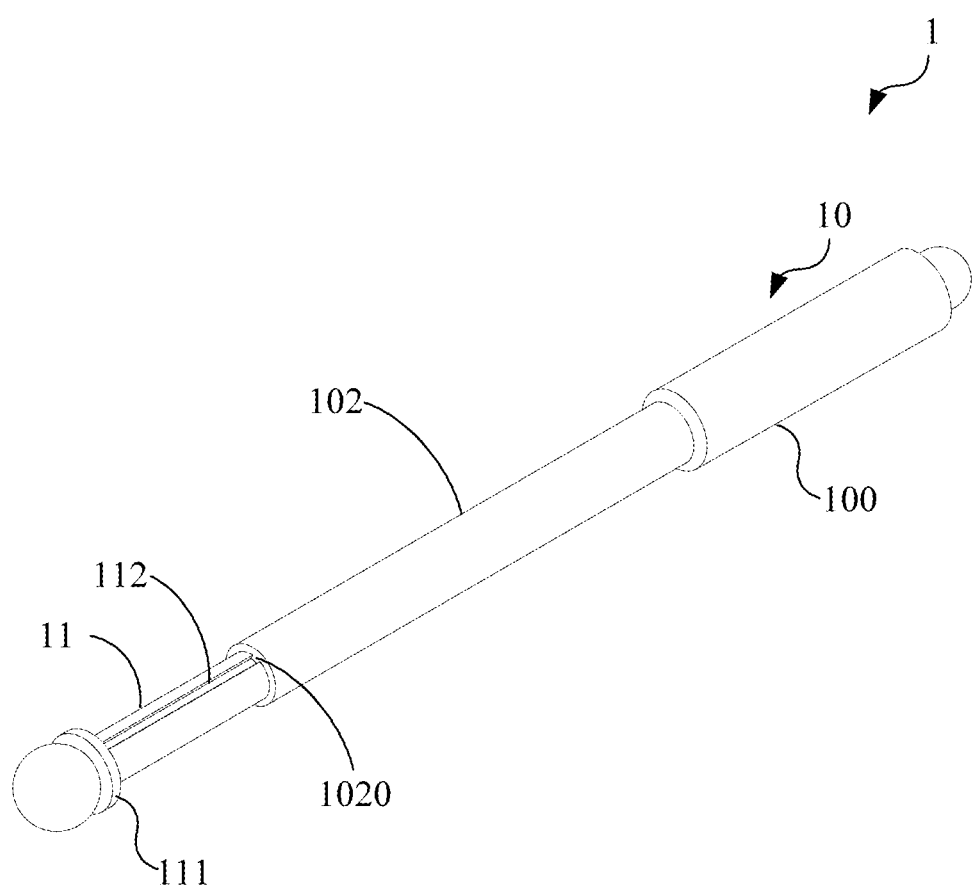
FIG. 5 shows a structure schematic diagram of one embodiment of the telescopic bracket of the present invention.

Please refer to FIG. 5. FIG. 5 shows a structure schematic diagram of one embodiment of the telescopic bracket 1 of the present invention. In order to facilitate the description, the spring 12 is omitted in FIG. 5. In this specific embodiment, in order to prevent the moving member 11 from idling rather than moving in the axial direction of the screw rod 101 by the rotating screw rod 101, both ends of the spring 12 are connected to the moving member 11 and the body 100 to restrict the moving direction of the moving member 11 through the rigidity of the spring 12. In addition, as shown in FIG. 5, in this specific embodiment, the protective member 102 further includes a first limiting member 1020 disposed on the inner surface, and the moving member 11 includes a second limiting member 112 corresponding to the first limiting member 1020. The second limiting member 112 is disposed on the outer surface of the moving member 11. The second limiting member 112 is a strip shaped groove or bump extending along the axial direction of the moving member 11 and the first limiting member 1020 is a strip shaped bump or groove corresponding to the second limiting member 112 and extending along the axial direction of the protective member 102. The first limiting member 1020 and the second limiting member 112 are engaged with each other.

Please refer to FIG. 3 again. As shown in FIG. 2, the telescopic bracket 1 of the present invention can be actuated electrically. The fixed assembly 10 may further include an actuating member 104. The actuating member 104 is configured to drive the fixed assembly 10 to cause the fixed assembly 10 to interlock with the moving member 11 and cause the moving member 11 to move along the fixed assembly 10. In practice, as shown in FIG. 3, the actuating member 104 is disposed at one end of the screw rod 101 and is coupled to the screw rod 101. The actuating member 104 is configured to drive the screw rod 101 to rotate. In practice, the actuating member 104 may be a motor, but is not limited thereto. Besides, the actuating member may further include a signal receiver for receiving an external signal to allow the actuating member to actuate to cause the screw rod to rotate.

Figures 6, 6A:
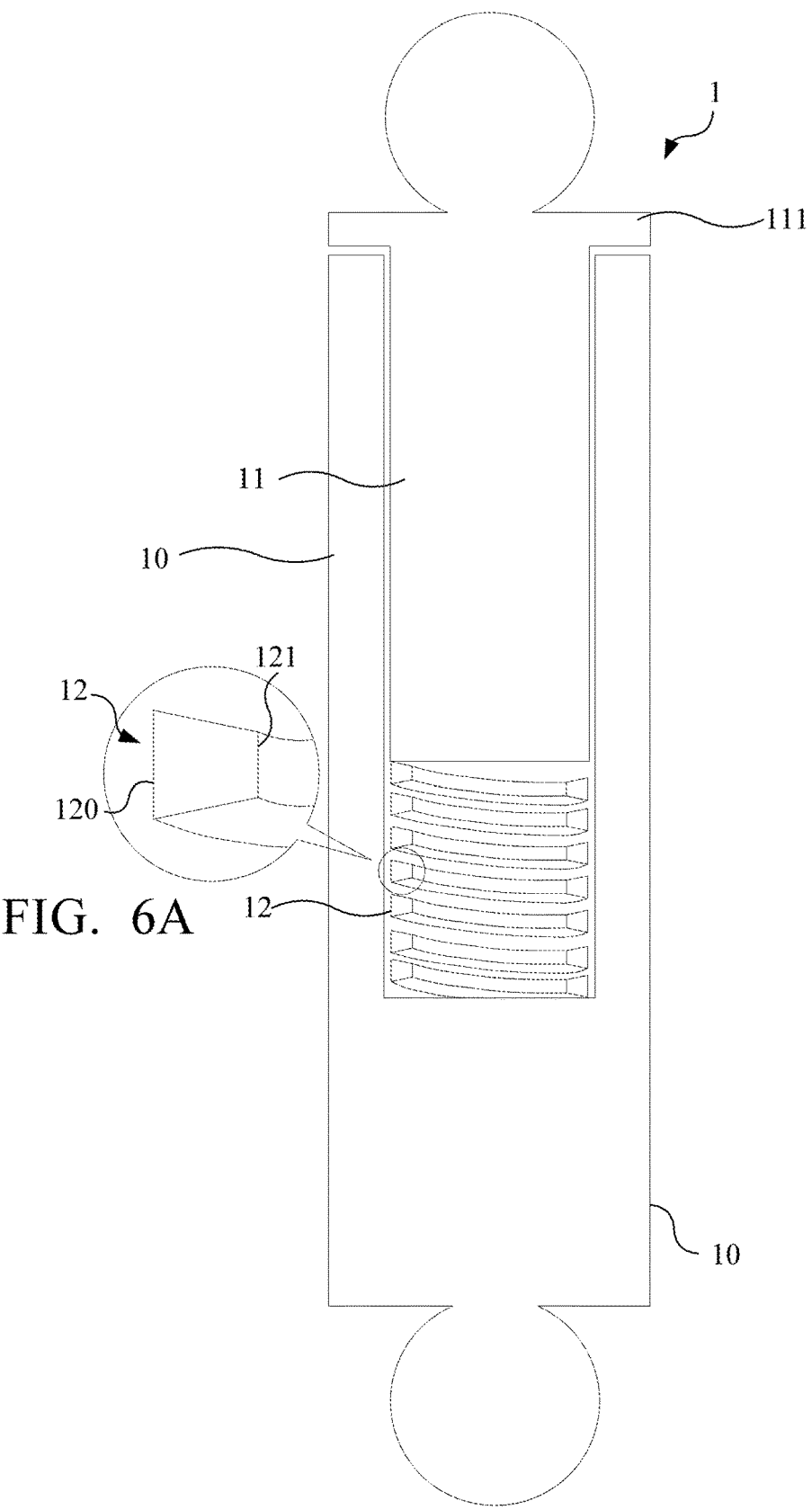
FIG. 6 shows a cross-sectional diagram of another embodiment of the telescopic bracket of the present invention.
FIG. 6A shows a partially enlarged schematic diagram of FIG. 6.

In addition to the above-mentioned setting of the moving member 11 sleeved on the fixed assembly 10, the telescopic bracket 1 may also be the setting of the moving member 11 mounted inside the fixed assembly 10. Please refer to FIG. 6 and FIG. 6A. FIG. 6 shows a cross-sectional diagram of another embodiment of the telescopic bracket 1 of the present invention and FIG. 6A shows a partially enlarged schematic diagram of FIG. 6. As shown in FIG. 6 and FIG. 6A, the moving member 11 is disposed in the fixed assembly 10, and one end of the moving member 11 is connected to the inside of the fixed assembly 10 by the spring 12. The cross section of the spring 12 is a trapezoidal shape, a rectangular shape, a square shape, a parallelogram shape, or an unequal quadrilateral shape, and is set in the retracted state of the telescopic bracket 1 in the compressed state. When no external resistance is applied to the fixed assembly 10 and the moving member 11, the elastic restoring force of the spring 12 can assist the moving member 11 to move along the axial direction of the fixed assembly 10, thereby causing the telescopic bracket 1 to switch between the retracted state and the extended state. It can be understood that a person with ordinary skill in the art may install the spring 12 to connect the fixed assembly 10 and the moving member 11 in other forms to achieve the telescopic ability of the telescopic bracket 1 of the present invention, but is not limited thereto.

Figure 7:
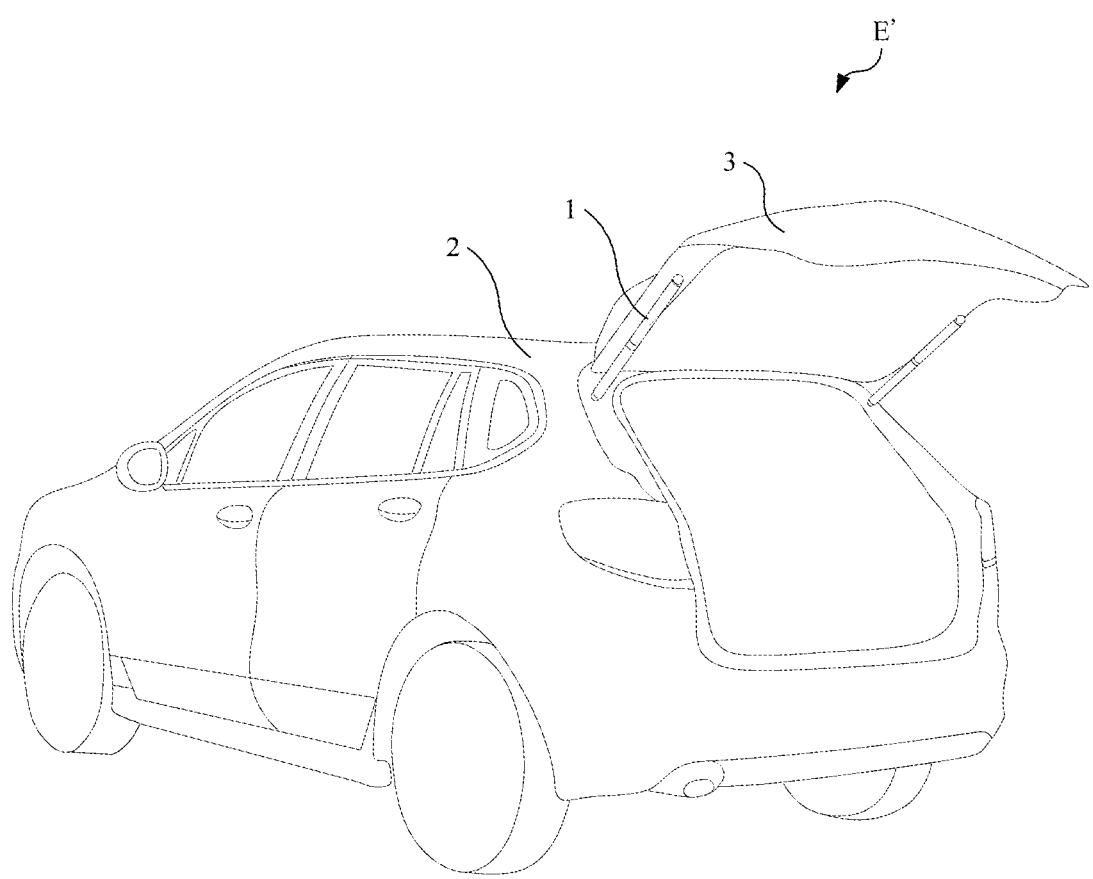
FIG. 7 shows a schematic diagram of one embodiment of the telescopic bracket and the open-up device using the same of the present invention.
Figure 8:
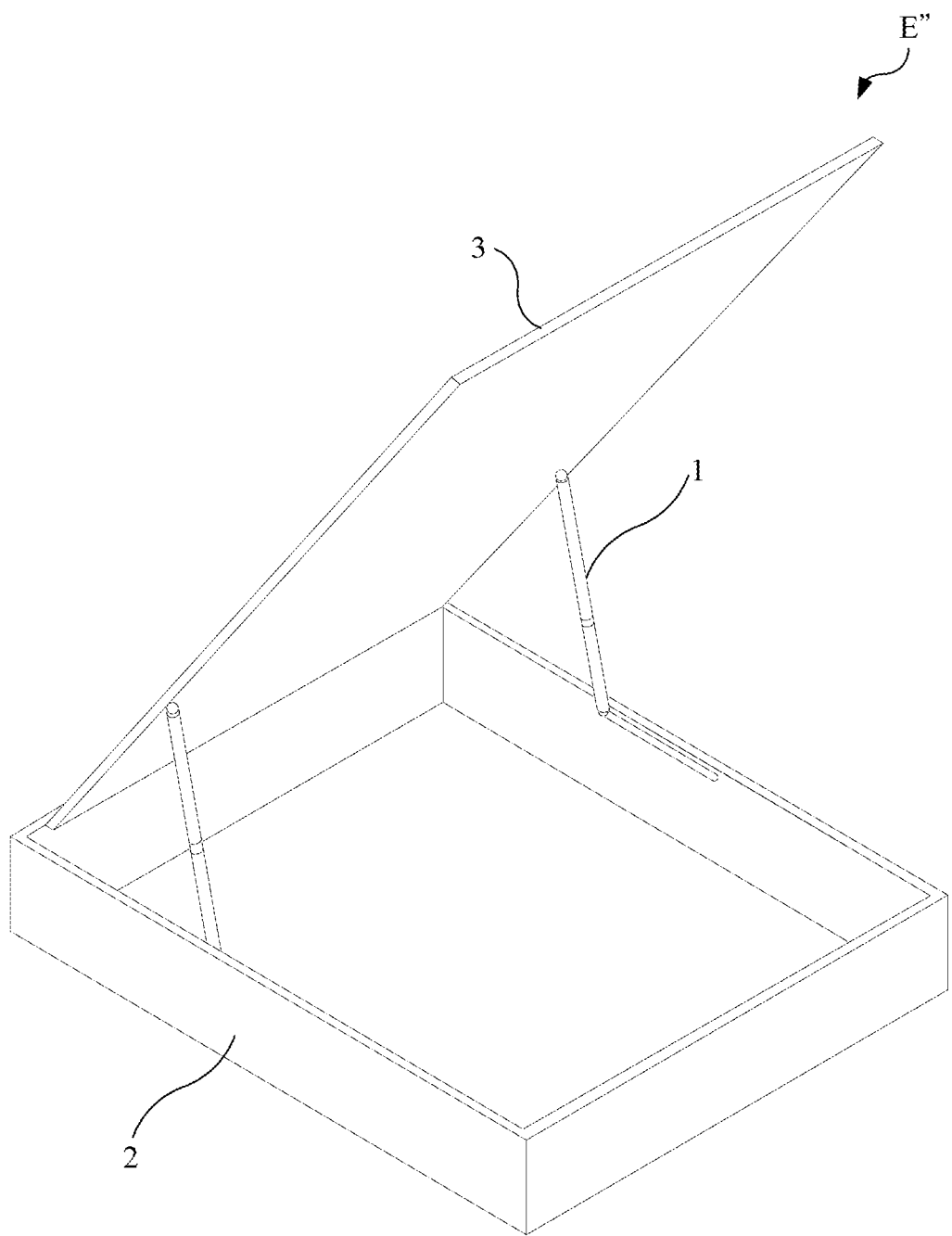
FIG. 8 shows a schematic diagram of another embodiment of the telescopic bracket and the open-up device using the same of the present invention.

Please refer to FIG. 7 and FIG. 8. FIG. 7 shows a schematic diagram of one embodiment of the telescopic bracket and the open-up device E' using the same of the present invention, and FIG. 8 shows a schematic diagram of another embodiment of the telescopic bracket and the open-up device E" using the same of the present invention. As shown in FIG. 7, the open-up device E' with a telescopic bracket 1 in this specific embodiment comprises a vehicle body as a base 2, the telescopic bracket 1 and a rear door as a cover 3. The telescopic bracket 1 is as described above, and will not be repeated here. One end of the telescopic bracket 1 is connected to the base 2 and the other end is connected to the cover 3. One end of the cover 3 is pivotally connected to the base 2. Wherein, the cover 3 can be open-up from the base 2 or closed-down to the base 2 with the pivot of the cover 3 and the base 2 as a fulcrum by the telescopic action of the telescopic bracket 1. As shown in FIG. 8, in this specific embodiment. When the base 2 is a bed frame, the cover 3 is a bed plate corresponding to the bed frame. It can be understood that a person with ordinary skill in the art can apply the open-up device E with the telescopic bracket to various devices that need to be opened up and closed down by using the foregoing embodiments. Besides, without affecting the operation of the telescopic bracket 1, a person with ordinary skill in the art may connect the telescopic bracket 1 with the base 2 and the cover 3 by any extension device, and is not limited to the above.

In the specific embodiment of FIG. 7 and FIG. 8, the telescopic bracket 1 of the open-up device E with the telescopic bracket may further include the actuating member 104 as described above, and the actuating member 104 has a signal receiver. The signal receiver can be configured for receiving an external signal to allow the actuating member 104 to act, so as to retract or extend the telescopic bracket 1. It is worth noting that the actuating member 104 of the present invention only engages with the screw rod 101 when receiving the external signal, so that the open-up device E with the telescopic bracket 1 of the present invention can be electrically actuated or manually operated. Accordingly, as shown in the specific embodiment of FIG. 7, in practice, a user may use a remote controller, or a controller or a sensor installed on the vehicle body to send the external signal with open up the rear door. When the actuating member 104 receives the external signal, the actuating member 104 engages with the screw rod 101 to cause the screw rod 101 to rotate axially, and drives the screwed moving member 11 to move axially. Therefore, the telescopic bracket 1 is extended, and the rear door is opened up. Conversely, the user can also use the remote control, or the controller or a sensor installed on the vehicle body to send the external signal with close down the rear door. When the actuating member 104 receives the external signal, the actuating member 104 engages with the screw rod 101 to cause the screw rod 101 to invert rotate axially, and drives the screwed moving member 11 to move axially. Therefore, the telescopic bracket 1 is retracted, and the rear door is closed down. In particular, in this embodiment, the user can also close the rear door manually because the actuating member 104 only engages with the screw rod 101 after receiving the signal. Therefore, the actuating member 104 will not be allowed to jam the screw rod 101, and the telescopic bracket 1 cannot be retracted or extended by external force. The specific embodiment of FIG. 8 is also as described above, and will not be repeated here.

Compared with the prior art, the telescopic bracket 1 of the present invention is screwed to the second screw thread 110 of the moving member 11 by the first screw thread 1010 of the screw rod 101 on the fixed assembly 10. The telescopic bracket 1 connects the fixed assembly 10 and the moving member 11 with two ends of the spring 12 respectively. Therefore, when the screw rod 101 rotates in the axial direction, the moving member 11 can move in the axial direction of the screw rod 101 corresponding to the rotation direction of the screw rod 101. Applying this telescopic bracket 1 to the open-up device E, when the user opens up the cover 3 from the base 2, the cover 3 can be opened up from the base 2 by the user without the effort of the auxiliary force of the telescopic bracket 1. Besides, the cover 3 can be supported by the spring 12 of the telescopic bracket 1, so that the cover 3 does not fall due to its own gravity. In addition, the telescopic bracket 1 and the open-up device E to which it is applied can be operated electrically or manually.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A telescopic bracket having a retracted state and an extended state, the telescopic bracket comprising:
   a fixed assembly, further comprising a body and a screw rod extending from the body, the screw rod having a first screw thread and being able to rotate on the body along the axial direction of the screw rod;
   a moving member, sleeving on a periphery of the screw rod and movably coupled to the fixed assembly to move along an axial direction of the fixed assembly, the inside of the moving member having a second screw thread corresponding to the first screw thread, so that the moving member being able to move along the axial direction of the screw rod corresponding to the rotation direction of the screw rod, thereby the telescopic bracket switching between the retracted state and the extended state; and a spring disposed between the fixed assembly and the moving member to provide an elastic restoring force to the moving member, wherein the cross section of the spring is a trapezoidal shape, a rectangular shape, a square shape, a parallelogram shape, or an unequal quadrilateral shape.

2. The telescopic bracket of the claim 1, wherein when the telescopic bracket is in the retracted state, the spring is in a compressed state to provide the elastic restoring force to the fixed assembly and the moving member along the moving direction of the moving member to assist the telescopic bracket to switch from the retracted state to the extended state.

3. The telescopic bracket of the claim 1, wherein the fixed assembly further comprises a protective member sleeving on a periphery of the moving member, one end of the protective member is coupled to the body, and the protective member is configured to protect an exposed portion of the screw rod, which is exposed after the moving member moves along the axial direction far from the body.

4. The telescopic bracket of the claim 3, wherein the protective member further comprises a first limiting member disposed on the inner surface therein, the moving member comprises a second limiting member corresponding to the first limiting member, and the second limiting member is disposed on the outer surface of the moving member, wherein the first limiting member and the second limiting member are engaged with each other to restrict the moving member to move along the axial direction of the screw rod.

5. The telescopic bracket of the claim 1, wherein the fixed assembly further comprises an actuating member disposed therein, and the actuating member is configured to drive the fixed assembly to cause the fixed assembly driving the moving member to move along the axial direction of the fixed assembly.

6. An open-up device having a telescopic bracket, comprising:

a base;

a telescopic bracket, a first end of the telescopic bracket coupled to the base, the telescopic bracket having a fixed assembly, a moving member and a spring, wherein the moving member is disposed in the fixed assembly and movably coupled to the fixed assembly to move along an axial direction of the fixed assembly, causing the telescopic bracket to switch between the retracted state and the extended state, the spring is disposed in the fixed assembly and coupled to one end of the moving member and an inside end of the fixed assembly to provide an elastic restoring force to the moving member, the cross section of the spring is a trapezoidal shape, a rectangular shape, a square shape, a parallelogram shape, or an unequal quadrilateral shape; and a cover coupled to a second end of the telescopic bracket, one side of the cover pivotally coupled to the base; thereby, the cover is able to rotate relative to the base; wherein the cover is opened-up from the base or closed to the base by a pivot formed at the position where the cover is pivotally coupled to the base, through the telescopic action of the telescopic bracket.

7. The open-up device of the claim 6, wherein the telescopic bracket further comprises an actuating member, which has a signal receiver configured to receive an external signal for actuating the actuating member; thereby, the telescopic bracket is retracted or extended.

8. The open-up device of the claim 6, wherein the base is a car body and the cover is a car door corresponding to the car body.

9. The open-up device of the claim 6, wherein the base is a bed frame and the cover is a bed plate corresponding to the bed frame.

* * * * *